US008284231B2

(12) United States Patent
Ellner

(10) Patent No.: US 8,284,231 B2
(45) Date of Patent: Oct. 9, 2012

(54) VIDEO SELECTOR

(75) Inventor: Henrik Ellner, Stockholm (SE)

(73) Assignee: Google Inc., Mountain View, CA (US)

( * ) Notice: Subject to any disclaimer, the term of this patent is extended or adjusted under 35 U.S.C. 154(b) by 1141 days.

(21) Appl. No.: 12/213,883

(22) Filed: Jun. 25, 2008

(65) Prior Publication Data
US 2009/0322854 A1 Dec. 31, 2009

(51) Int. Cl.
H04N 7/15 (2006.01)
(52) U.S. Cl. .................................. 348/14.08; 348/14.09
(58) Field of Classification Search ............... 348/14.08, 348/14.09
See application file for complete search history.

(56) References Cited

U.S. PATENT DOCUMENTS

| 5,638,114 | A | 6/1997 | Hatanaka et al. | |
|---|---|---|---|---|
| 5,801,756 | A | 9/1998 | Iizawa et al. | |
| 6,025,870 | A | 2/2000 | Hardy | |
| 6,346,963 | B1 | 2/2002 | Katsumi | |
| 6,577,333 | B2 * | 6/2003 | Tai et al. | 348/14.08 |
| 6,812,956 | B2 | 11/2004 | Ferren et al. | |
| 7,007,098 | B1 | 2/2006 | Smyth et al. | |
| 7,015,954 | B1 | 3/2006 | Foote et al. | |
| 2002/0191072 | A1 | 12/2002 | Henrikson | |
| 2004/0105004 | A1 | 6/2004 | Rui et al. | |
| 2006/0066717 | A1 | 3/2006 | Miceli | |
| 2007/0064094 | A1 * | 3/2007 | Potekhin et al. | 348/14.08 |

FOREIGN PATENT DOCUMENTS

| JP | 7-15711 A | 1/1995 |
|---|---|---|
| WO | WO-02/49356 A2 | 6/2002 |

OTHER PUBLICATIONS

Patent Cooperation Treaty International Search Report for International Application No. PCT/EP2009/057252 mailed on Aug. 27, 2009.
European Search Report for European Patent Application No. 08146463.1 dated Jun. 23, 2009.

* cited by examiner

Primary Examiner — Stella Woo
(74) Attorney, Agent, or Firm — Young Basile Hanlon MacFarlane P.C.

(57) ABSTRACT

The invention provides a method for selecting input video signals in a video conference for transmission. The method bases its selection decision on the momentary voice activity of the participants, but does so while observing constraints aimed at:
  improving stability of the image seen by each participant;
  decreasing flickering of the image;
  choosing comfortable and helpful swapping times between different image configurations; and
  reflecting the importance which is attributed to persons having a higher past average activity in a natural conference.
In one embodiment of the invention, the set of constraints includes an override, by which one or more participants can be selected irrespectively of the selection decision.
In accordance with a second aspect of the invention, there is provided video selector hardware comprising units to perform the steps of the method.

15 Claims, 6 Drawing Sheets

VIDEO SELECTOR

FIELD OF THE INVENTION

The present invention relates to video conferencing. More precisely, it relates to a method for selecting input signals in a video conference and to a video selector applying this method.

BACKGROUND OF THE INVENTION

To the largest possible extent, a video conference should eliminate the impression of a physical separation between its participants. In addition to providing high image and sound quality, a useful video conference system should facilitate each conferee's participation by automatically pre-eliminating irrelevant information so that he or she is faced with a manageable flow and can comfortably focus on the discussion. In a real life situation, a manageable information flow is created by the participant alone by simply directing his or her eyes and ears at a speaking person, or by alternating between persons in a group currently involved in a discussion. Besides, the conferee will in most cases arrive at the meeting with an expectation of particular participants being more frequent or more interesting speakers than others, or will develop an appreciation for this in the course of the meeting. Unconsciously guided by the recent history of the conference, the conferee will direct attention to them more often.

Bridging the gap between the extreme simplicity in selecting the focus at a natural meeting and the restricted field of view in a video conference is arguably the most challenging difficulty facing the constructor of a video conference system. Most likely, convenience for participants and the training time needed to get started are also crucial factors for the commercial success of video conferences.

Inherently aimed at overcoming the geographical separation of its participants, a video conference system is faced with bandwidth limitations in practically all its uses. This is an additional incentive to single out interesting visual and aural information with due care, allowing this information to be transmitted at an acceptable quality level.

Several prior art video conference systems exist and are described in patent documents.

U.S. Pat. Nos. 5,638,114, 5,801,756 and 6,025,870 represent early attempts towards solving the technical problem of selecting an image in accordance with the activity of the participants in the video conference. U.S. Pat. No. 5,638,114 discloses a television conference system which monitors audio activity at different physical locations and distributes the corresponding video signals, possibly combined into one image, from active locations to all locations. Likewise, U.S. Pat. No. 5,801,756 discloses a video conference system including a central unit which mixes selected input video signals into one output video signal, which is distributed to local terminals. The selection is based on the voice activity measured in the near past at the local terminals. The video conference system can be configured to prefer one of the terminals to others—for instance, a terminal used by a lecturer should take precedence over those of the students—but apart from this does not offer any possibility of adapting the properties of the system to different conference situations. Finally in U.S. Pat. No. 6,025,870, there is described an automatic video switch for use in a video conference system. The switch selects one focus video source, on the basis of event information provided by an audio processing module and/or a graphics processing module, and transmits its image signal to other sites.

The fundamental dilemma of these three conference systems is their simple approach to selecting input video signals. It is a one-layer approach in the sense that the selection is made on the basis of voice activity either momentarily or in a time interval ranging from the present instant to a point located some non-zero distance back in time. The constructor considering to decrease the length of the interval has to weigh an attentive switching behaviour—new speakers will be let in with little delay—against an increasingly flickering image, and vice versa. The resulting compromise solution will not always be acceptable to the potential users, and is rarely one that suits all imaginable conference situations. Indeed, the described systems do not develop a long-term understanding of the conference and its participants, but automatically take predetermined actions in response to predetermined recognised events.

U.S. Pat. No. 6,812,956 proposes an approach where the task of selecting signals is formulated in the form of a standard optimisation problem. A finite number of possible output configurations (candidate solutions) are predefined, wherein each output configuration specifies a routing of output signals to output devices. The output configurations are compared and selected on a substantially continuous basis, by evaluating a desirability (target function), which maps each output configuration to a real number based on "activity", "saturation", "continuity", "participant priorities" and "security levels". The relative importance of the factors is determined by weights, which are adjustable parameters. At regular intervals, the system assesses all possible output configurations by calculating their desirabilities, concludes whether the current output configuration is the most desirable, and switches to a different configuration if this is not the case. In contrast with the one-layer switching methods mentioned above, the method disclosed in this patent takes account of two points in time: the present instant, at which momentary voice activity is measured, and a point at a predetermined distance "Δt" back in time, at which "audio undercoverage" and "audio overcoverage" are determined. These quantities, which form part of the "activity" contribution to the desirability, are expected to capture a discrepancy between the signals that were selected and the signals at which audio activity effectively took place.

The approach suggested in U.S. Pat. No. 6,812,956 has three main drawbacks. Firstly, setting the system up for the first time will include acquiring an understanding of the meaning of the weights which are included in the desirability function. For the tuning of the parameters, a few test rounds with a realistic number of participants will be needed; the test rounds cannot be too short, since the conference system apparently reviews the past continually. Secondly, there is a need for reconfiguring or at least resetting the system as soon as a participant arrives or leaves, since this will add or remove a number of possible output configurations, for which the desirability is henceforth evaluated in the update procedure. Thirdly and most seriously, since the solution is an implementation of an extremely general approach, it is not adapted to all aspects of video conferencing. Most notably, computational complexity limits its scalability. To illustrate, in a scenario where combined pictures are allowed which include up to four participants selected from a total of p participants, the number of possible output configurations is $$\binom{p}{1}+\binom{p}{2}+\binom{p}{3}+\binom{p}{4}=O(p^4).$$

Evaluating the desirability of each configuration will impose a huge computational burden on the system for typical values of p. The intervals between reassessments of the output configuration could certainly be increased in order to reduce the impact of this problem, but doing so would inevitably increase the response time of the system.

To summarise our discussion, there is a long felt need in the field of video conferencing for a satisfactory solution to the problem of selecting input signals. The requirements on a successful video conference system which solves this problem include:

- the selecting algorithm faithfully reproduces typical human behaviour and produces an accurate yet engaging representation of the physically separated participants;
- the response time of the system is short, so that new speakers are quickly selected and thus shifted into focus;
- the system takes into account the past behaviour of the conferees, to reflect a reasonable expectation on their future activity;
- the image does not flicker or make discomforting transitions;
- the system has feasible scaling characteristics with respect to the number of participants and is bandwidth economical;
- the system is easy to set up and can be used by layman participants after a moderate training time;
- the number of participants can be easily increased or decreased while the system is running;
- the system can be adapted to the needs of the respective users; and
- the dynamic properties of the selecting can be easily adapted to a multitude of conference scenarios, ranging from business meetings and court proceedings, over education and professional training, to private use and entertainment applications.

SUMMARY OF THE INVENTION

The present context being video conference technology, we will use "participant" as a synonym of both "video signal" and "audio signal". This is not intended to limit the scope of the invention by excluding, e.g., use of the invention in a situation where an image of a group of participants is transmitted by one video signal.

It is an object of the present invention to provide an improved method for selecting video signals, as well as a video selector applying this method, which represents an improvement over prior art as regards the above requirements. It would moreover be advantageous to provide an easy-to-use setup procedure by limiting the number of configuration parameters and keeping their meanings clear and non-technical.

These and other objects are achieved by a method and a device as defined by independent claims 1 and 8 of the present application. Preferred embodiments are defined by the dependent claims.

In accordance with a first aspect of the invention, there is provided a method for selecting input video signals in a video conference. The method bases its selection decision on the momentary voice activity of the participants, but does so while observing constraints aimed at:

- improving stability of the image seen by each participant;
- decreasing flickering of the image;
- choosing comfortable and helpful swapping times between different image configurations; and
- reflecting the importance which is attributed to persons having a higher past average activity (accumulated voice activity) in a natural conference.

In accordance with a second aspect of the invention, there is provided video selector hardware comprising units to perform the steps of the method.

To respond to requirements of different applications, particular embodiments of the invention model the accumulated voice activity as either:

- a moving average, for obtaining a straightforward sum of each participant's activity;
- a recursive relation, for decreasing computational load while retaining an infinite time horizon;
- a multi-linear function of the most recent voice activity detections, which can be a weighted average designed to meet general user requirements; or
- a function which is independent of voice activity detections older than a predetermined number, for increasing the possibility of gradual changes in the conference characteristics.

In accordance with another embodiment of the invention, the set of constraints includes an override, by which one or more participants can be selected irrespectively of the outcome of the selection algorithm. This is particularly useful in an education context or at a press conference, where there is a main person who should stay in focus irrespectively of voice activity. It is noted that the number of participants selected via the override constraint is always less than the total number of selected participants.

In accordance with yet another embodiment of the invention, the video selector includes an audio mixer and so provides the core of a complete solution to the problem of routing audio and video signals in a video conference.

In accordance with a further embodiment of the invention, the video selector forms part of a video conference system including input and output devices, which, respectively, transmit audio and video signals to the video selector and receive the video signals currently being selected by the video selector. One or more output devices in a video conference system may comprise a video mixer adapted to generate an output video signal. Optionally, the video mixer is preceded by a filter which blocks one or more unwanted signals, such as the signal representing the image of the participant using the output device. Further optionally, the video mixer generates a Brady Bunch view, i.e., a split screen as described in U.S. Pat. No. 7,015,954, on the basis of the selected signals.

Finally, in accordance with another embodiment the invention, one or more input devices in a video conference system are adapted to derive input image format information from the subset of video signals which are currently selected for transmission by the video selector. This is bandwidth economical and can increase the quality of the final image seen by the participants.

These and other aspects of the invention will be apparent from and elucidated with reference to the embodiments described hereinafter.

BRIEF DESCRIPTION OF THE DRAWINGS

The invention will now be described in more detail and with reference to the appended drawings, of which.

DETAILED DESCRIPTION OF PREFERRED EMBODIMENTS

Figure 1:
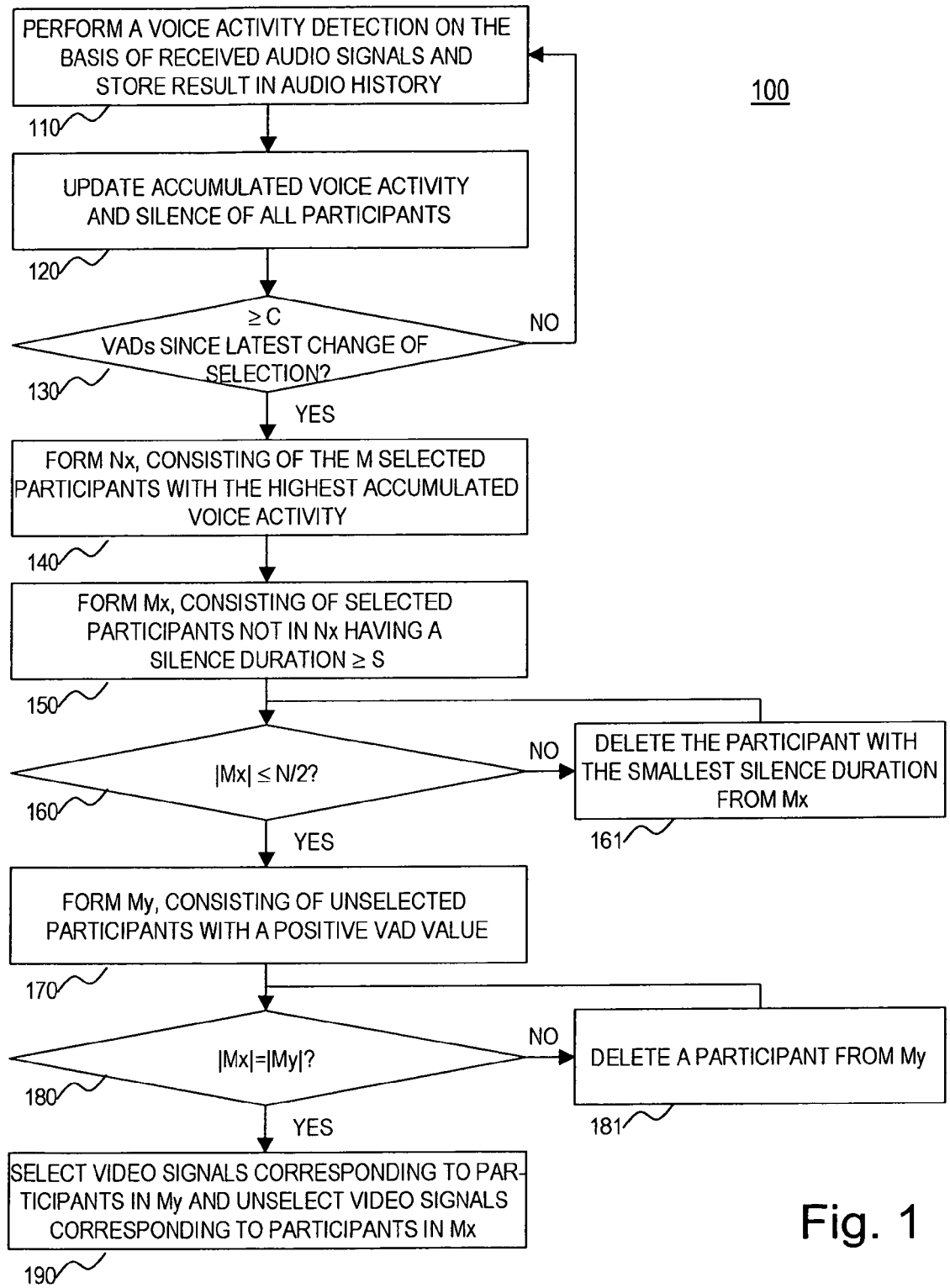
FIG. 1 is a flow chart which illustrates a process implementing the method according to a first aspect the present invention.
Figure 2:
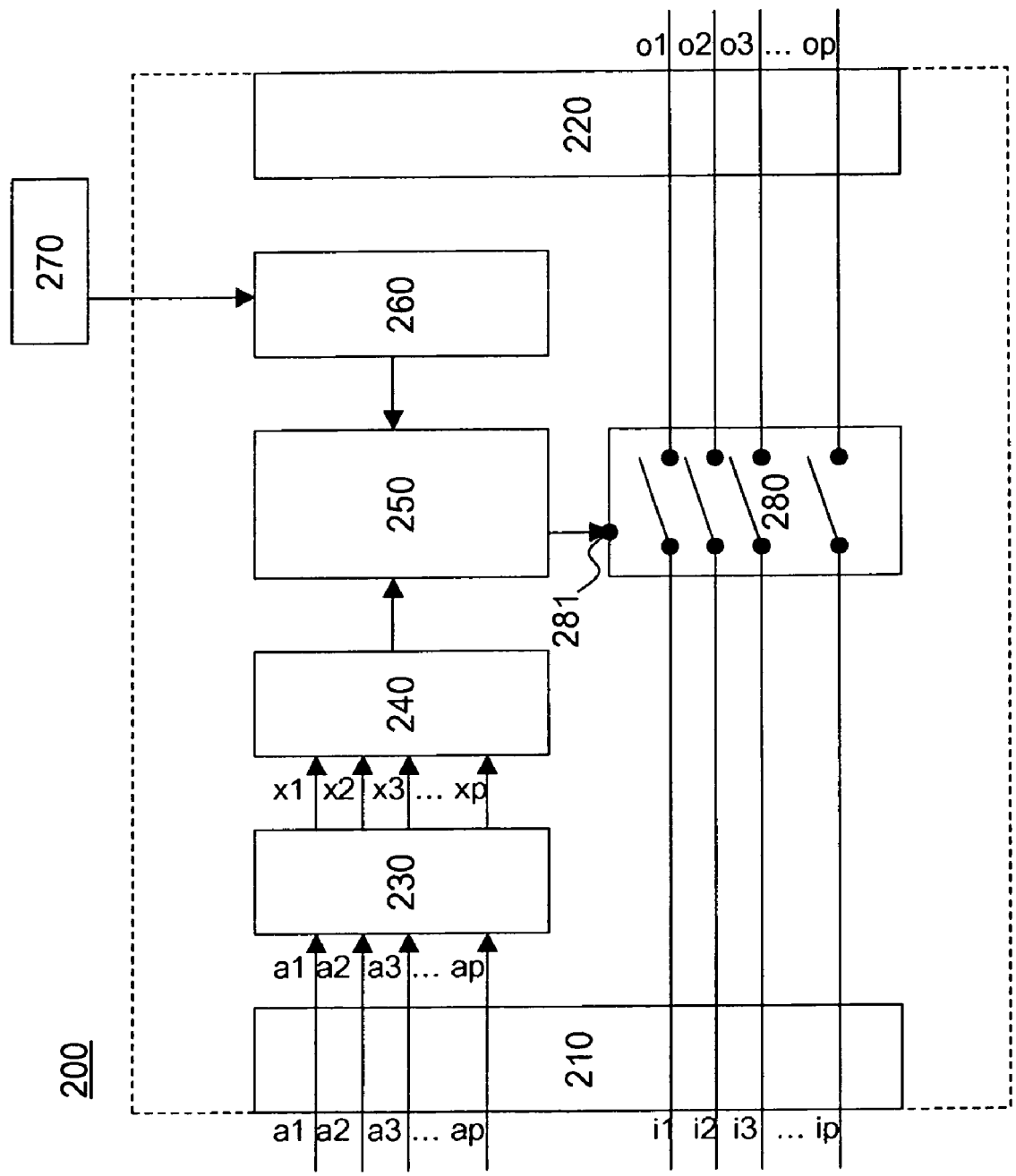
FIG. 2 is a block diagram of a video selector according to a second aspect of the present invention.

A preferred embodiment of a video selector according to the present invention will now be described with reference to FIGS. 1 and 2, which respectively show a process 100 representing a preferred embodiment of the method for selecting video signals and a video selector 200 applying this method.

From input devices (not shown), the video selector continuously receives at an input gateway 210 input video signals i1, i2, i3, ..., ip and input audio signals a1, a2, a3, ..., ap, wherein each input video signal is associated with exactly one input audio signal. The number p of signals is not assumed to be constant. On the basis of at least the values of the input audio signals, the video selector 200 selects a subset of the input video signals to be transmitted to output devices (not shown) via an output gateway 220 as output video signals o1, o2, o3, ..., op. Hence, from the point of view of the input video signals and output video signals, the video selector 200 acts as a switch that either connects or disconnects i1 to o1, i2 to o2, and so forth. It is important to note that all output video signals o1, o2, o3, ..., op, each of which may be connected or not to the respective input video signals i1, i2, i3, ..., ip, are provided to each output device (not shown); see FIG. 5.

Before proceeding to the description of the components of the video selector 200, it is noted that although the preferred embodiment is illustrated by a circuit diagram, the purpose of this diagram is to explain the principles of a video selector according to the invention by way of a hardware example. The invention may equally well be implemented by means of a programmable computer system organised in a suitable, different manner. Likewise, a connection line in any of FIGS. 2-6 may represent, e.g., a metal wire, an optical fibre cable, a temporarily allocated route in the world wide web or a wireless connection. A group of parallel signals may also be transmitted over one composite line or as one data stream containing the totality of the audio or video information. We finally note that a power supply section, a clock and similar auxiliary components have been intentionally omitted from FIGS. 2-6, since their addition is considered to belong to the general knowledge of the skilled person.

The input audio signals a1, a2, a3, ..., ap are provided to a voice activity detector 230, which assigns and outputs one binary value for each input audio signal. A binary 1 denotes a positive result—the voice activity is above a predetermined threshold—whereas a binary 0 denotes a negative result. Binary output signals x1, x2, x3, ..., xp of the voice activity detector 230 are updated at discrete points in time. These are preferably equally spaced in time, in which case an interval between two consecutive update points will be occasionally referred to as a time unit of the system. The output signals may also be updated on an event-driven basis. The voice activity detection may be based on measurements of the momentary audio power, on the average audio power in a time interval of non-zero length, on analysis of waveform features, such as power spectrum, audio correlation, zero crossings and cepstrum, or on some weighted average.

The set of output signals x1, x2, x3, ..., xp of the voice activity detector 230 is called a voice activity detection (VAD). The VAD is fed to a shift register 240, which stores an audio history consisting of a predetermined number of the most recent VADs. The shift register 240 is adapted to discard the least recent VAD when a new VAD is to be stored. Moreover, all VAD values stored in the shift register 240 can be read off at any point in time.

There is further provided a user interface 270, which forms part of the video selector 200 or an external unit, and by means of which values of parameters defining quantitative properties of the video selector can be entered and stored in a memory 260.

Using past and actual VADs, as provided by the shift register 240, and using the parameter values stored in the memory 260, a processing unit 250 selects which input video signals i1, i2, i3, ..., ip are to be connected to the respective output video signals o1, o2, o3, ..., op and subsequently fed to the output gateway 220. The selected signals are connected and the unselected signals are disconnected by means of a switch 280, which is controllable by the processing unit 250 via a control signal gate 281 provided at the switch 280. The processing unit 250 may update its selection of signals as soon as the voice activity detector 230 updates its VAD signals x1, x2, x3, ..., xp. Preferably, however, the voice activity detector 230 updates its VAD more frequently to ensure a moderately stable selection of signals while providing a high-resolution audio history.

Having described the hardware structure of the video selector 200, the process 100, by which the processing unit 250 selects the video signals which are to be connected to the output gate 220, will now be discussed with reference generally to FIG. 1.

In the process 100, which represents a preferred embodiment of the invention, the number of selected video signals is constant and equal to a number T which is set by a user. Occasionally, the number of participants does not exceed T and the task of selecting is trivial: all participants are selected. Therefore, preferably, the process 100 does not run unless the number of participants exceeds T. As a consequence of this, there will be T selected participants whenever the process 100 runs.

The number T can be increased or decreased by a user during operation. One method of incorporating this into the operation of the system is to make an immediate corresponding adjustment to the number of selected participants, by selecting an unselected participant (T increased) or unselecting a selected participant (T decreased). How to suitably choose a participant in this situation belongs to the know-how of the skilled person.

The process 100 begins in step 110. It is assumed that parameters C, N, S and M, which define quantitative properties of the selecting, have been previously stored in the memory 260. As will become clear from the following description, there is no impediment to adjusting the parameters during operation. Parameter C governs how often the set of selected signals is updated, parameter N limits the amount by which the set of selected signals is allowed to change at one update, parameter S is a measure of the video selector's patience with silent participants and parameter M, finally, defines the number of important participants which are subject to a special treatment by the selector. It is further assumed that the processing unit 250 stores, for each participant:

a silence duration, which is equal to zero if the latest VAD assigns a positive value to the participant and, if not, a positive integer representing a length (in time units) of an ongoing silent period; and an accumulated voice activity, which is based on the most recent VADs.

The set of currently selected signals, referred to below, consists of those signals for which the switch 280 connects input and output video signals. In step 110, a VAD at the input audio signals is performed by the voice activity detector 230, and the result $x_1, x_2, x_3, \ldots, x_p$ is stored in the shift register 240. In step 120, the VAD result is used by the processing unit 250 to update the silence duration and the accumulated voice activity of each participant. In accordance with the definition above, the processing unit 250 increments the silence duration by one if the VAD is negative and resets it to zero if the VAD is positive. The accumulated voice activity preferably is a function which is monotone with respect to the latest VAD, i.e., it does not decrease if the VAD is positive and it does not increase if the VAD is negative. Suitable choices of an accumulated voice activity include:

a moving average over the most recent VADs,
a recursive relation, and
a multi-linear function or weighted average of the most recent VADs.

A recursive relation may have a form according to Equation 1:

$$A_j(t_n) = \begin{cases} x_j(t_0) & \text{if } n = 0 \\ \alpha x_j(t_n) + (1-\alpha) A_j(t_{n-1}) & \text{if } n \geq 1 \end{cases}, 1 \leq j \leq p,$$

Equation 1 where $A_j(t_n)$ is the accumulated voice activity of the $j^{th}$ signal, $t_n$ is a discrete point in time between the $n^{th}$ and $(n+1)^{th}$ VAD, $x_j(t_n)$ denotes the value of $x_j$ at time $t_n$, and $0 < \alpha < 1$. In a particular embodiment, the accumulated voice activity is a function which is independent of VADs older than D time units, where D is a number in accordance with the parameters defining quantitative properties of the selecting. It is noted that the shift register 240 must be able to store at least D VADs in this case, whereas there is no need to store an audio history when a recursive relation is used as an accumulated voice activity.

In step 130 the processing unit 250 assesses whether C (see above) VADs have been performed since the last time the selection of video signals was changed. Hence, C is the maximum ratio of the update frequency of the VADs as compared to the update frequency of the selection of video signals.

If this is found true, the process 100 proceeds to step 140, in which a set Nx is formed consisting of the M (see above) selected participants with the highest accumulated voice activity. These participants are considered to be more important than the others, and will be guaranteed to remain selected irrespectively of their VAD values. To achieve this, in step 150, a set Mx is formed consisting of participants which:

are currently selected;
do not belong to Nx; and
have a silence duration greater than or equal to S (see above).

In step 160, it is assessed whether Mx contains more than N/2 (see above) participants, in which case the process 100 proceeds to step 161 and deletes from Mx that participant which has the smallest silence duration. When the process reaches step 170, the set Mx contains at most N/2 participants.

In step 170, a set My is formed consisting of all unselected participants with a positive VAD value. In step 180, it is determined whether My contains as many elements as Mx, and, if this is not the case, a sufficient number of participants are deleted from My. When the process reaches step 190, the number of participants in My is equal to the number of participants in Mx and thus does not exceed N/2. This way, the number of selected participants is kept constant.

In step 190, finally, the participants in the sets Mx and My change places: the processing unit 250 selects the video signals corresponding to participants in My and unselects video signals corresponding to participants in Mx. The processing unit then operates the switch 280 in order that a connection is established between the input gateway 210 and the output gateway 220 for exactly the selected video signals. The process 100 is now finished.

Looking back at the steps of the process 100, one observes that all operations can be performed by traversing the set of participants linearly. Hence, the computational complexity of the algorithm is linear with respect to the number of participants. This computationally lean approach enables a response time to new participant activity that is not dictated by hardware performance but can be chosen to meet requirements on participants' viewing comfort.

Arrivals of new participants and departures of existing participants at a running video conference according to the invention can be handled without any need for restarting the video selector system. Besides, all the parameters defining quantitative properties of the selecting represent quantities which relate to the visible result of the mixing, such as the acceptable number of participants being removed or added from the output image at an update, and therefore do not need to be adjusted when the number of participants changes.

Finally, it is clear from the design of the process 100 that the parameters defining quantitative properties of the selection, which have been provided by a user, have the following meaning:

a previously selected input signal remains selected during at least C consecutive VADs, and a previously unselected signal remains unselected during at least C consecutive VADs;

between two consecutive VADs, the total number of signals being changed either from previously selected to unselected or from previously unselected to selected does not exceed N;

a previously selected input video signal is unselected only if a value 0 has been assigned to this signal in S consecutive VADs; and input signals remain selected if they have been associated with the M greatest values of the accumulated voice activity as calculated based on the most recent VADs.

In these rules (and in the corresponding phrases in the patent claims) the word "previously" refers to the selection of signals which is about to be updated and not to any previous point in time.

Figure 3:
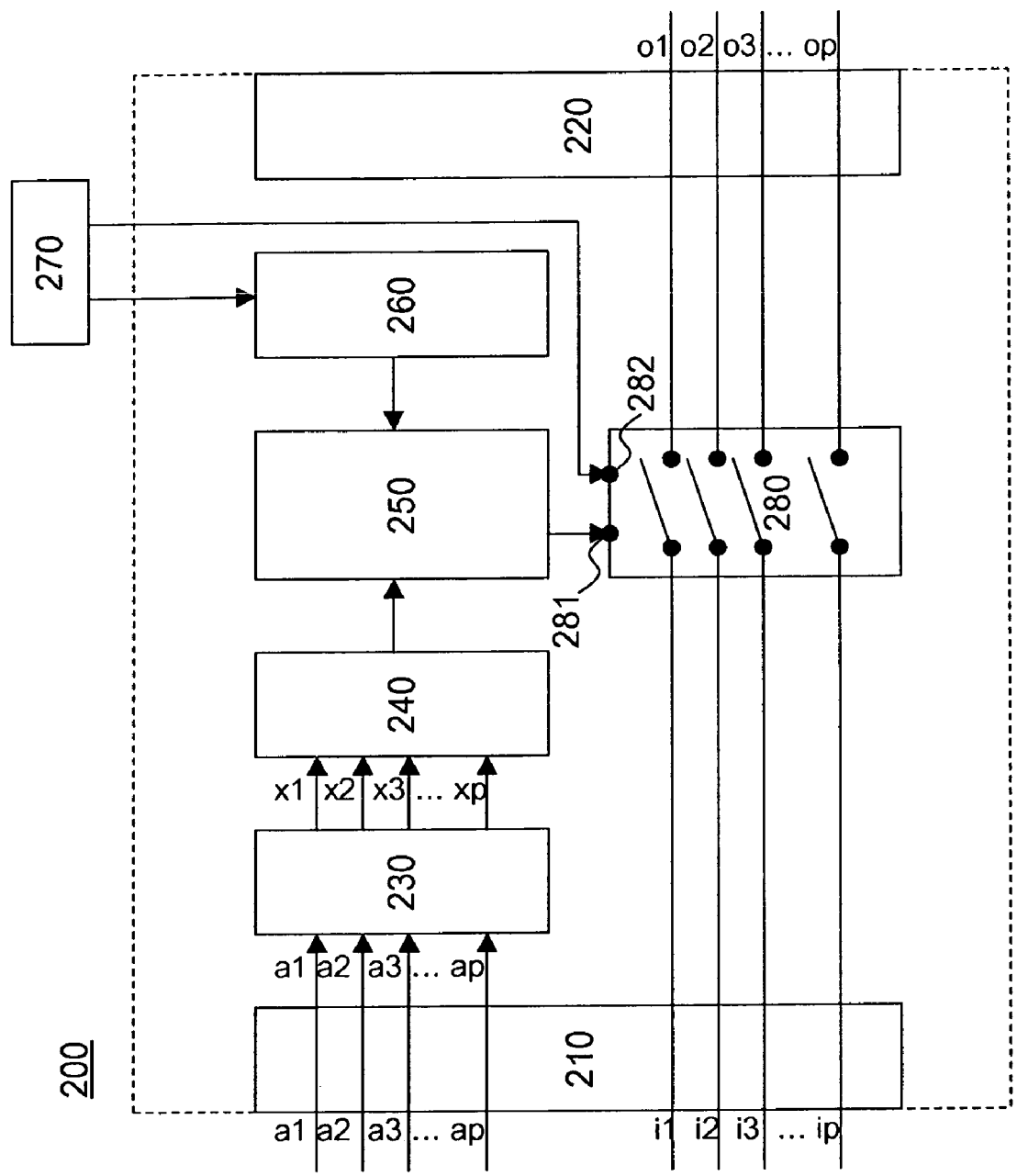
FIG. 3 is a block diagram of a video selector incorporating an override control, in accordance with an embodiment of the invention.

FIG. 3 depicts a particular embodiment of a video selector 200 according to the invention, wherein the switch 280 further comprises an override port 282, which takes precedence over the control signal port 281. Via the interface 270, a user can select one or more video signals to be permanently selected. In no case, however, can the entire subset of selected signals be determined by the override.

Figure 4:
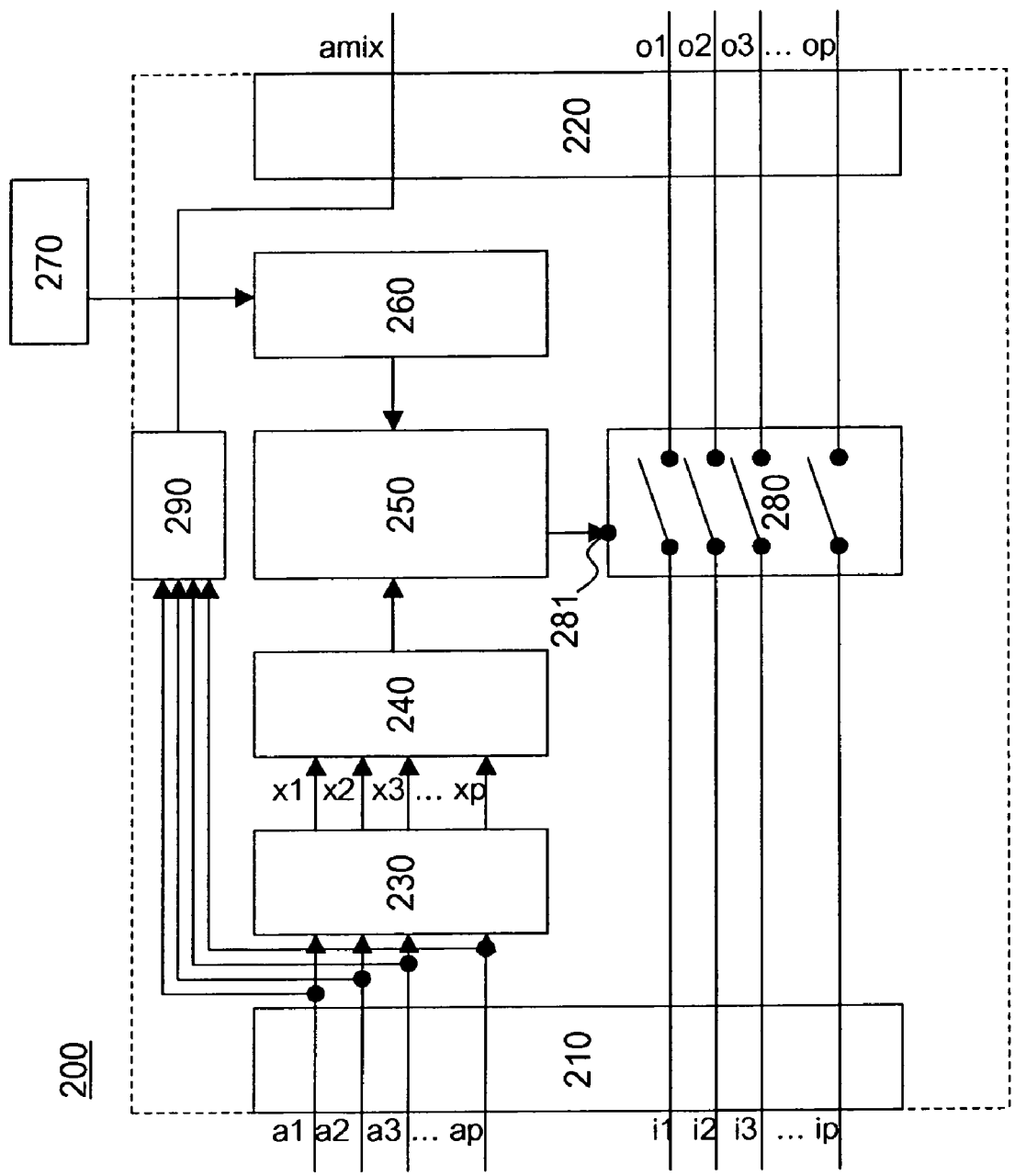
FIG. 4 is a block diagram of a video selector including an audio mixer, in accordance with another embodiment of the invention.

FIG. 4 depicts another particular embodiment of a video selector 200 according to the invention, wherein the video selector further comprises an audio mixer 290. The received input audio signals $a_1, a_2, a_3, \ldots, a_p$ are mixed into one output audio signal amix, which is provided at the output gateway 220. The audio mixer 290 may operate according to one of the following exemplary mixing strategies:

all signals are added;
a subset of the signals are added;

signals corresponding to selected participants are mixed with a higher power gain than signals corresponding to unselected participants; and signals corresponding to selected participants are processed in order to be more perceptible than signals corresponding to unselected participants.

In accordance with another embodiment of the invention, the input audio signals are not mixed in the video selector 200, but are transmitted in parallel to both the video selector 200 and to the output devices 520.

Figure 5:
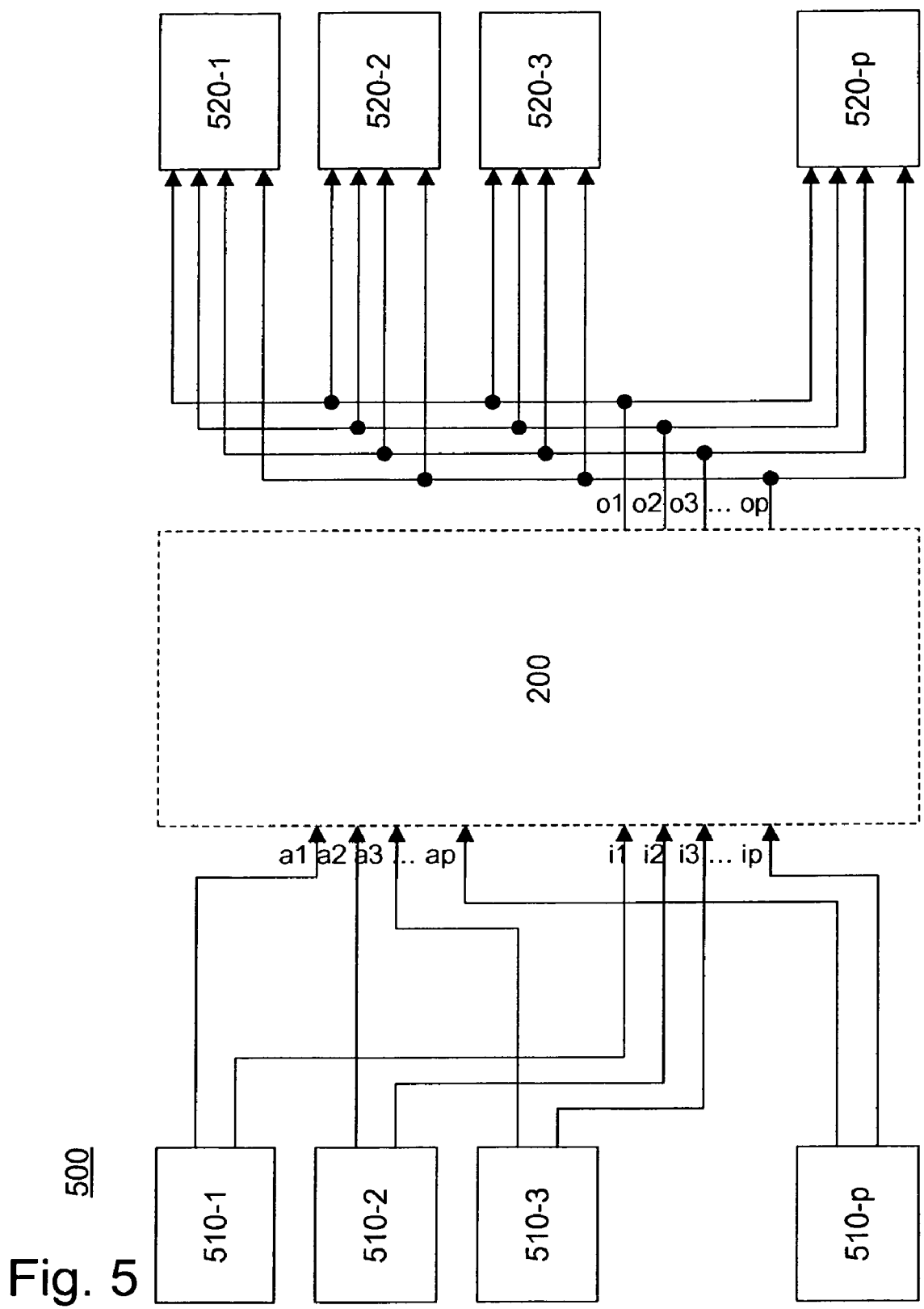
FIG. 5 is a block diagram showing a video conference system in which operates a video selector according to an embodiment of the invention.

FIG. 5 shows a video conference system 500, which includes a video selector 200 according to any of the above embodiments of the invention, input devices 510 and output devices 520. When activated by a user, each input device 510-$j$ provides one input audio signal aj and one input video signal ij to the video selector 200. Depending on the voice activity that is detected at the input audio signals, the switch 280 included in the video selector 200 connects or disconnects each input video signal ij to its corresponding output video signal oj. Each output devices 520-$j$ is adapted to receive all output video signals o1, o2, o3, . . . , op.

In this connection, it is noted that some input devices 510 and/or output devices 520 may have audio capabilities only. Such devices can be included in the video conference system 500 without necessarily being connected to the video selector 200.

Figure 6:
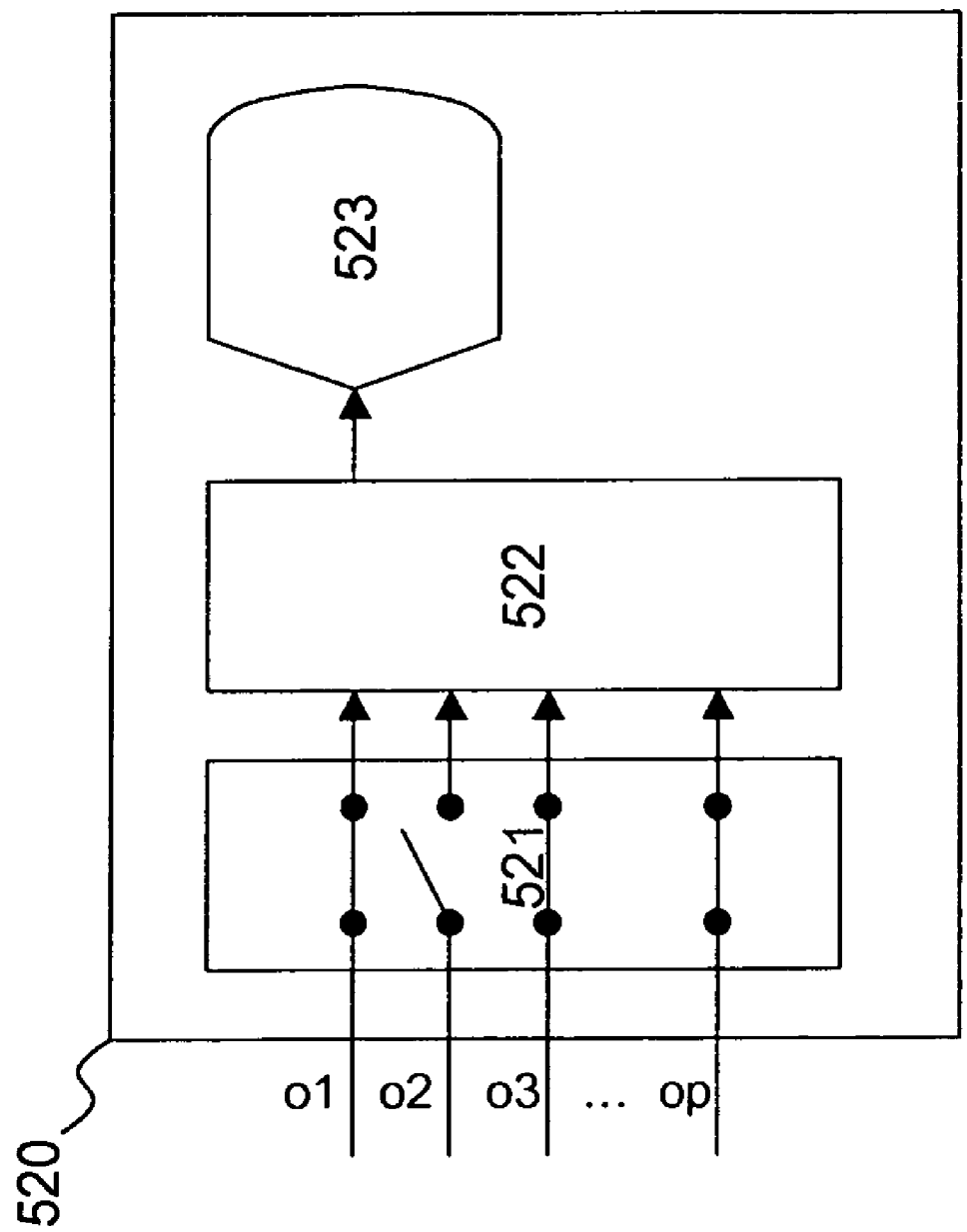
FIG. 6 is a block diagram of an output device included the video conference system of FIG. 5.

FIG. 6 shows a preferred embodiment of an output device 520 forming part of the video conference system 500 of FIG. 5. The output device 520 includes a video mixer 522 preceded by a filter 521, by which one or several video signals can optionally be blocked from mixing. One reason for blocking a signal at an output device 520 is that it corresponds to the image of the participant using this output device 520. In the example shown in FIG. 6, the output device 520 does not display video signal o2 but displays all other signals. The video mixer 522 is adapted to generate one output video signal, which is fed to a display 523. The mixed picture can be one of:

a Brady Bunch view (see U.S. Pat. No. 7,015,954),
a split screen, and
an image composed of sub-images having different formats.

The characteristics of the mixed picture, the order of the sub-images and the properties of the filter 521 are preferably configured at each output device 520.

An input device 510-$j$ and a corresponding output device 520-$j$ may be separate physical units or be contained in the same physical unit. In a preferred embodiment, however, at least one of the input devices 510 receives possibly from one of the output devices 520—information about the current selection of video signals at the video selector 200. From this information, said at least one input device 510 derives input image format information.

As an illustration, consider a system having the following characteristics:

the output image format is X1 by X2 picture elements;
the video selector 200 selects T=4 video signals; and
the output devices generate a Brady Bunch view on the basis of the selected video signals.

In this situation, it is most bandwidth economical to receive input video signals in the format X1/2 by X2/2 picture elements. If the input devices are adapted accordingly, a transformation between different image formats is avoided. Such a transformation would otherwise be detrimental to the quality of the output image in most cases, especially if different resolutions are defined by the respective image formats.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

Itemized List of Embodiments

Item 1. A method for selecting input video signals in a video conference, comprising the steps of:

receiving, from a user, values of a set of parameters defining quantitative properties of the selecting;

continuously receiving at least one input video signal;

receiving, for each input video signal, an associated input audio signal and performing a recurring voice activity detection, VAD, which assigns a binary value to each input video signal, wherein a value 1 means that voice activity is detected and a value 0 means that it is not;

selecting for transmission those input video signals to which a value 1 has been assigned and unselecting those input video signals to which a value 0 has been assigned, unless doing so would violate at least one constraint in a set comprising:

(i) a steadiness constraint, stipulating, firstly, that any previously selected input signal shall remain selected, and, secondly, that any previously unselected signal shall remain unselected during at least C consecutive VADs;

(ii) an anti-flickering constraint, stipulating that between two consecutive VADs the total number of signals being changed either from previously selected to unselected or from previously unselected to selected shall not exceed N;

(iii) a swapping-time constraint, stipulating that no previously selected input video signal shall be unselected unless a value 0 has been assigned to the signal at S consecutive VADs; and (iv) a preference constraint, stipulating that any input video signals shall remain selected if they have been associated with the M greatest values of an accumulated voice activity, which is based on the most recent VAD outputs, where C, N, S and M are numbers in accordance with the set of parameters defining quantitative properties of the selecting; and continuously transmitting the input video signals selected for transmission.

Item 2. The method of item 1, wherein said accumulated voice activity is one in the group comprising:

a moving average based on the most recent VAD outputs, a recursive relation including the one most recent VAD output, a multi-linear function of the D most recent VAD outputs, and a function which is independent of VAD outputs not belonging to the D most recent VADs, wherein D is a number in accordance with the set of parameters defining quantitative properties of the selecting.

Item 3. The method of any one of items 1-2, wherein the set of constraints further comprises:

(v) an override, stipulating that one or more signals, which are indicated by a user and which are fewer than the number of selected signals, shall be selected irrespectively of the outcome of the selecting step and constraints (i)-(iv).

Item 4. The method of any one of items 1-3, further comprising the steps of, at least one output device:
receiving the transmitted selected video signals;
optionally receiving blocking parameters and filtering one or more signals out in accordance with the blocking parameters; and
displaying a mixed image based on the transmitted video signals which have not been filtered out.

Item 5. The method of item 4, wherein the mixed image is a Brady Bunch view.

Item 6. The method of any one of items 1-5, further comprising the step of continuously transmitting a mixed audio signal based on the input audio signals.

Item 7. The method of any one of items 1-6, wherein each of the input video signals is received from an input device, said method further comprising deriving input image format information from the video signals which are currently selected for transmission.

Item 8. A video selector comprising:
a memory for storing values of a set of parameters defining the quantitative properties of the video selector;
an input gateway adapted to receive at least one video signal and, for each of said at least one video signal, an associated audio signal;
an output gateway adapted to transmit a subset or the full set of said at least one video signal;
a video switch which connects the input and output gateways and which is controllable via a control signal port;
a voice activity detector adapted to repeatedly assign a binary value to each audio signal, wherein a value 1 means that voice activity is detected and a value 0 means that it is not;
a shift register adapted to store an audio history consisting of a predetermined number of the most recent output values of the voice activity detector; and
a processing unit adapted to control the video switch via its control signal port, in such a way that a video signal associated with an audio signal to which a value 1 has been assigned shall be connected to the output gateway and a video signal associated with an audio signal to which a value 0 has been assigned shall be disconnected from the output gateway, unless doing so would violate at least one constraint in a set comprising:
(i) a steadiness constraint, stipulating, firstly, that any previously connected video signal shall remain connected, and, secondly, that any previously disconnected signal shall remain disconnected during at least C consecutive output values of the voice activity detector;
(ii) an anti-flickering constraint, stipulating that the total number of video signals being changed either from previously connected to disconnected or from previously disconnected to connected shall not exceed N between two consecutive output values of the voice activity detector;
(iii) a swapping-time constraint, stipulating that no previously connected video signal shall be disconnected unless a value 0 has been assigned to the signal at S consecutive output values of the voice activity detector; and
(iv) a preference constraint, stipulating that any video signals shall be connected if they have been associated with the M greatest values of an accumulated voice activity, which is based on the most recent output values of the voice activity detector, where C, N, S and M are numbers in accordance with the set of parameters defining quantitative properties of the video selector.

Item 9. The video selector of item 8, wherein said accumulated voice activity depends only of the D most recent output values of the voice activity detector.

Item 10. The video selector of item 8, wherein the video switch is further controllable via an override port, which partially takes precedence over the control signal port.

Item 11. The video selector of any one of items 8-10,
further comprising an audio mixer adapted to generate an output audio signal on the basis of the audio signals, and
wherein the output gateway is further adapted to transmit the output audio signal.

Item 12. A video conference system comprising:
the video selector of any one of items 8-11;
at least one input device emitting an audio signal and a video signal to the input gateway of the video selector; and
at least one output device receiving a plurality of video signals from the video selector and receiving an audio signal.

Item 13. The video conference system of item 12, wherein at least one of said output device(s) further comprise(s):
a filter operationally adapted to filter one or more video signals out;
a video mixer adapted to generate an output video signal on the basis of the video signals which have not been filtered out.

Item 14. The video conference system of item 13, wherein the video mixer is adapted to produce a Brady Bunch view.

Item 15. The video conference system of any one of items 12-14, wherein said at least one input device is adapted to derive input image format information from the video signals which are currently connected to the output gateway.

The invention claimed is:

1. A method for selecting input video signals in a video conference, comprising the steps of:
receiving, from a user, values of a set of parameters defining quantitative properties of the selecting;
continuously receiving at least one input video signal;
receiving, for each input video signal, an associated input audio signal and performing a recurring voice activity detection, VAD, which assigns a binary value to each input video signal, wherein a value 1 means that voice activity is detected and a value 0 means that it is not;
determining a set of constraints including at least a steadiness constraint, an anti-flickering constraint, a swapping-time constraint and a preference constraint;
selecting for transmission those input video signals to which a value 1 has been assigned and unselecting those input video signals to which a value 0 has been assigned, unless doing so would violate at least one constraint in the set of constraints;
wherein the steadiness constraint stipulates, firstly, that any previously selected input signal shall remain selected, and, secondly, that any previously unselected signal shall remain unselected during at least C consecutive VADs;
wherein the anti-flickering constraint stipulates that between two consecutive VADs the total number of signals being changed either from previously selected to unselected or from previously unselected to selected shall not exceed N;
wherein the swapping-time constraint stipulates that no previously selected input video signal shall be unselected unless a value 0 has been assigned to the signal at S consecutive VADs; and
wherein the preference constraint stipulates that any input video signals shall remain selected if they have been associated with the M greatest values of an accumulated voice activity, which is based on the most recent VAD outputs,
where C, N, S and M are numbers in accordance with the set of parameters defining quantitative properties of the selecting; and
continuously transmitting the input video signals selected for transmission.

2. The method of claim 1, wherein said accumulated voice activity is one in the group comprising:
a moving average based on the most recent VAD outputs,
a recursive relation including the one most recent VAD output,
a multi-linear function of the D most recent VAD outputs, and
a function which is independent of VAD outputs not belonging to the D most recent VADs,
wherein D is a number in accordance with the set of parameters defining quantitative properties of the selecting.

3. The method of claim 1, wherein the set of constraints further comprises:
an override, stipulating that one or more signals, which are indicated by a user and which are fewer than the number of selected signals, shall be selected irrespectively of the outcome of the selecting step and the steadiness, anti-flickering, swapping-time and preference constraints.

4. The method of claim 1, further comprising the steps of, at least one output device:
receiving the transmitted selected video signals;
optionally receiving blocking parameters and filtering one or more signals out in accordance with the blocking parameters; and
displaying a mixed image based on the transmitted video signals which have not been filtered out.

5. The method of claim 4, wherein the mixed image is a Brady Bunch view.

6. The method of claim 1, further comprising the step of continuously transmitting a mixed audio signal based on the input audio signals.

7. The method of claim 1, wherein each of the input video signals is received from an input device, said method further comprising deriving input image format information from the video signals which are currently selected for transmission.

8. A video selector comprising:
a memory for storing values of a set of parameters defining the quantitative properties of the video selector;
an input gateway adapted to receive at least one video signal and, for each of said at least one video signal, an associated audio signal;
an output gateway adapted to transmit a subset or the full set of said at least one video signal;
a video switch which connects the input and output gateways and which is controllable via a control signal port;
a voice activity detector adapted to repeatedly assign a binary value to each audio signal, wherein a value 1 means that voice activity is detected and a value 0 means that it is not;
a shift register adapted to store an audio history consisting of a predetermined number of the most recent output values of the voice activity detector; and
a processing unit adapted to:
determine a set of constraints including at least a steadiness constraint, an anti-flickering constraint, a swapping-time constraint and a preference constraint; and
control the video switch via its control signal port, in such a way that a video signal associated with an audio signal to which a value 1 has been assigned shall be connected to the output gateway and a video signal associated with an audio signal to which a value 0 has been assigned shall be disconnected from the output gateway, unless doing so would violate at least one constraint in the set of constraints:
wherein the steadiness constraint stipulates, firstly, that any previously connected video signal shall remain connected, and, secondly, that any previously disconnected signal shall remain disconnected during at least C consecutive output values of the voice activity detector;
wherein the anti-flickering constraint stipulates that the total number of video signals being changed either from previously connected to disconnected or from previously disconnected to connected shall not exceed N between two consecutive output values of the voice activity detector;
wherein the swapping-time constraint stipulates that no previously connected video signal shall be disconnected unless a value 0 has been assigned to the signal at S consecutive output values of the voice activity detector; and
wherein the preference constraint stipulates that any video signals shall be connected if they have been associated with the M greatest values of an accumulated voice activity, which is based on the most recent output values of the voice activity detector,
where C, N, S and M are numbers in accordance with the set of parameters defining quantitative properties of the video selector.

9. The video selector of claim 8, wherein said accumulated voice activity depends only of the D most recent output values of the voice activity detector.

10. The video selector of claim 8, wherein the video switch is further controllable via an override port, which partially takes precedence over the control signal port.

11. The video selector of claim 8,
further comprising an audio mixer adapted to generate an output audio signal on the basis of the audio signals, and
wherein the output gateway is further adapted to transmit the output audio signal.

12. A video conference system comprising:
the video selector of claim 8;
at least one input device emitting an audio signal and a video signal to the input gateway of the video selector; and
at least one output device receiving a plurality of video signals from the video selector and receiving an audio signal.

13. The video conference system of claim 12, wherein at least one of said output device(s) further comprise(s):
a filter operationally adapted to filter one or more video signals out;
a video mixer adapted to generate an output video signal on the basis of the video signals which have not been filtered out.

14. The video conference system of claim 13, wherein the video mixer is adapted to produce a Brady Bunch view.

15. The video conference system of claim 12, wherein said at least one input device is adapted to derive input image format information from the video signals which are currently connected to the output gateway.

* * * * *